United States Patent
Bossaer et al.

(10) Patent No.: US 12,382,850 B2
(45) Date of Patent: Aug. 12, 2025

(54) ADJUSTABLE MOUNT FOR IMPLEMENT CAMERA

(71) Applicant: MACDON INDUSTRIES LTD., Winnipeg (CA)

(72) Inventors: Austin Bossaer, Waunakee, WI (US); Karl Hundt, Lake Mills, WI (US); Nolan Monhollen, Sun Prairie, WI (US)

(73) Assignee: MacDon Industries LTD., Winnipeg (CA)

( * ) Notice: Subject to any disclaimer, the term of this patent is extended or adjusted under 35 U.S.C. 154(b) by 371 days.

(21) Appl. No.: 18/081,807

(22) Filed: Dec. 15, 2022

(65) Prior Publication Data
US 2023/0132104 A1    Apr. 27, 2023

Related U.S. Application Data

(63) Continuation-in-part of application No. 17/499,333, filed on Oct. 12, 2021, and a continuation-in-part of application No. 17/499,237, filed on Oct. 12, 2021, now Pat. No. 12,207,580.

(51) Int. Cl.
| | |
|---|---|
| *A01B 69/00* | (2006.01) |
| *F16M 11/04* | (2006.01) |
| *F16M 11/18* | (2006.01) |

(52) U.S. Cl.
CPC .......... *A01B 69/001* (2013.01); *F16M 11/046* (2013.01); *F16M 11/18* (2013.01)

(58) Field of Classification Search
None
See application file for complete search history.

(56) References Cited

U.S. PATENT DOCUMENTS 7,792,622 B2 *  9/2010  Wei .................. A01B 69/001
                                                345/589

FOREIGN PATENT DOCUMENTS

| CN | 106550175 A | * | 3/2017 | |
|----|-------------|---|--------|---|
| CN | 111896045 A | * | 11/2020 | ............ G01D 21/02 |
| EP | 3932162 A1 | | 1/2022 | |
| EP | 3967119 A1 | | 3/2022 | |
| EP | 3984341 A1 | | 4/2022 | |

* cited by examiner

*Primary Examiner* — Rodney E Fuller
(74) *Attorney, Agent, or Firm* — Miller Canfield

(57) ABSTRACT

An adjustable camera system comprises a camera, a mounting assembly and a controller. The mounting assembly is coupled to the camera and adapted to raise and lower the camera. The controller is configured to use an image of an object from the camera to determine whether the camera is at an optimal position from the object. If the controller determines that the camera is not at the optimal position, the controller sends a signal to the mounting assembly to raise or lower the camera.

22 Claims, 16 Drawing Sheets

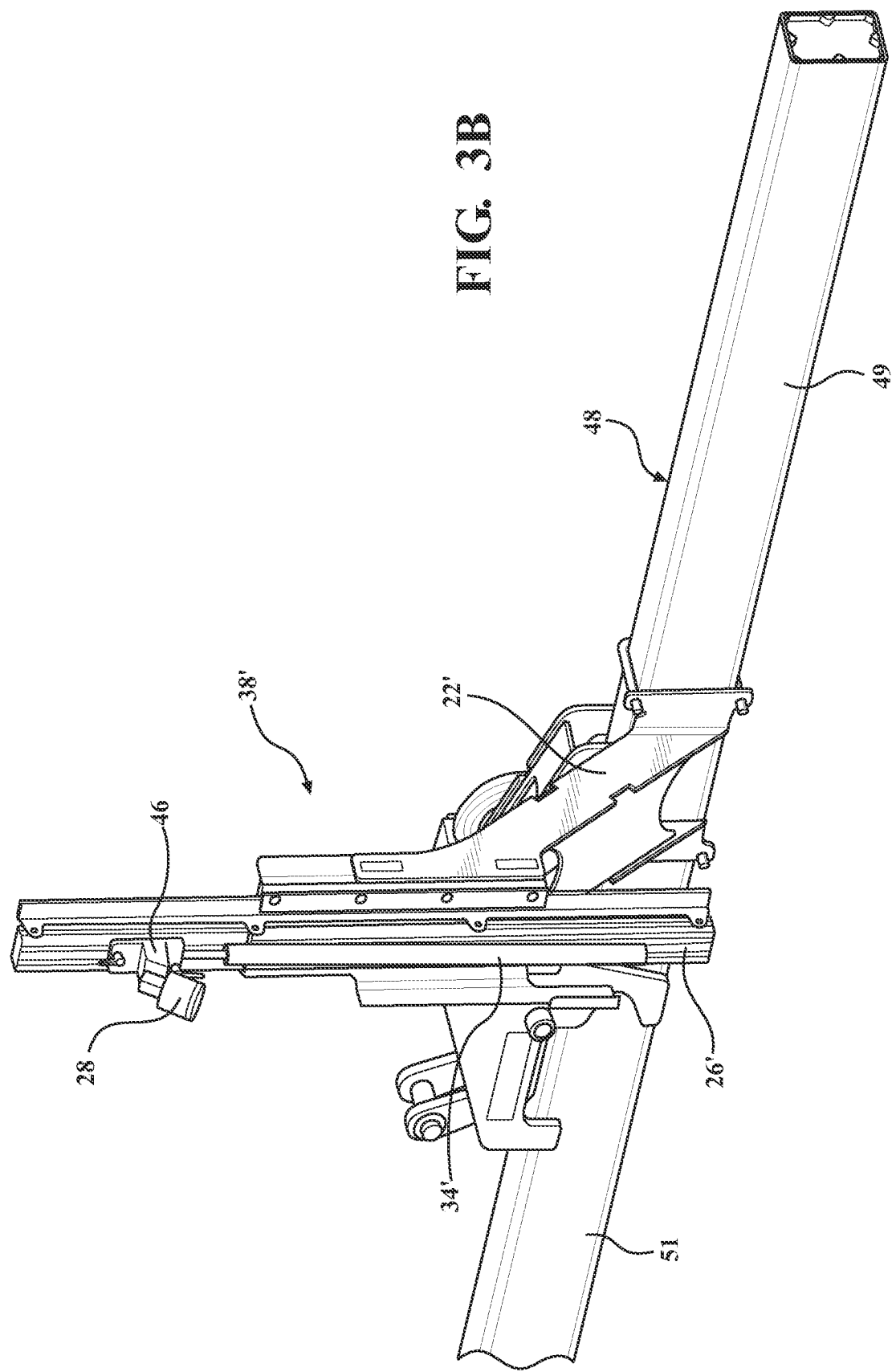

ADJUSTABLE MOUNT FOR IMPLEMENT CAMERA

CROSS REFERENCE TO RELATED APPLICATION

This application is a continuation-in-part of U.S. patent application Ser. No. 17/499,237 entitled TRAILED IMPLEMENT WITH VISION GUIDANCE, which was filed on Oct. 12, 2021, and which is incorporated in its entirety by reference. This application is also a continuation-in-part of U.S. patent application Ser. No. 17/499,333 entitled PRECISION CULTIVATOR WITH VISION GUIDANCE, which was filed on Oct. 12, 2021, and which is incorporated in its entirety by reference.

BACKGROUND OF THE INVENTION

1. Field of the Invention

The present invention relates to a system and method for autonomously adjusting a position of a camera mounted on an agricultural machine.

2. Description of the Related Art

Cameras are known to be mounted on farming equipment to visually capture the surrounding area. The data from the cameras is known to be used for monitoring the spatial relationship between the agricultural machine to which it is attached and the crops growing in the field. The data captured by the cameras is used for multiple purposes, including but not limited to, assisting with autonomous control of the agricultural machine. Therefore, the placement and resulting perspective of the camera with respect to the crop is critically important. Currently, cameras are manually positioned on and attached to an agricultural machine prior to beginning work on a field of crop and are manually adjusted throughout the process of working on the field, as necessary. The manual adjustment of the camera can be a time-consuming and burdensome task, particularly when necessary while working in the middle of a field.

Maintaining the proper perspective is important for accurate data gathering and it is known to manually adjust the camera at multiple points in time, including but not limited to, during the initial pre-operation setup, during operation in the field, and when the agricultural machine travels between fields of different crops. During the initial set-up, prior to operation of the agricultural machine, an operator will adjust the camera's mounted position on the agricultural machine by manually, physically attaching the camera to the agricultural machine at the desired position. During operation, as the agricultural machine travels across the field or fields, the rows of crop may be growing at different rates. As a result, the camera's fixed perspective is no longer ideal for the height of the crop being traversed by the agricultural machine. Therefore, the data being captured by the camera may not be accurate because the camera is blocked due to the height of the crop. Another scenario during operation is when the agricultural machine moves from a field growing one type of crop to a different field growing a different type of crop, the spacing of the crop rows may change. For example, if the prior field has 15 inch spacing between the rows and the next field has 38 inch spacing between the rows, this change would also impact the perspective of the camera's position with respect to the rows of crop.

SUMMARY OF THE INVENTION

Therefore, there is a need for a camera that is mounted to an agricultural machine that automatically and autonomously adjusts its position to gain the correct perspective with respect to the crop prior to starting work on a field of crop and as the agricultural machine is working on the field to yield accurate information.

The current invention satisfies these needs by configuring a system that autonomously adjusts a position of a camera mounted to an agricultural machine. According to one embodiment, an adjustable camera system comprises a camera, a mounting assembly and a controller. The mounting assembly is coupled to the camera and adapted to raise and lower the camera. The controller is configured to use an image of an object from the camera to determine whether the camera is at an optimal position from the object. If the controller determines that the camera is not at the optimal position, the controller sends a signal to the mounting assembly to raise or lower the camera.

According to another embodiment, there is provided a method for autonomously adjusting a position of a camera mounted to an agricultural machine. The method comprises obtaining an image of an object from the camera, using the image to determine whether the camera is at an optimal position from the object, and if it is determined that the camera is not at the optimal position, raising or lowering the camera.

Other objects and purposes of the invention, and variations thereof, will be apparent upon reading the following specification and inspecting the accompanying drawings.

BRIEF DESCRIPTION OF THE DRAWINGS

Advantages of the present disclosure will be readily appreciated as the same becomes better understood by reference to the following detailed description when considered in connection with the accompanying drawings, wherein:

FIG. 3B illustrates a perspective view of an alternative embodiment of an adjustable camera system;

Figure 1:
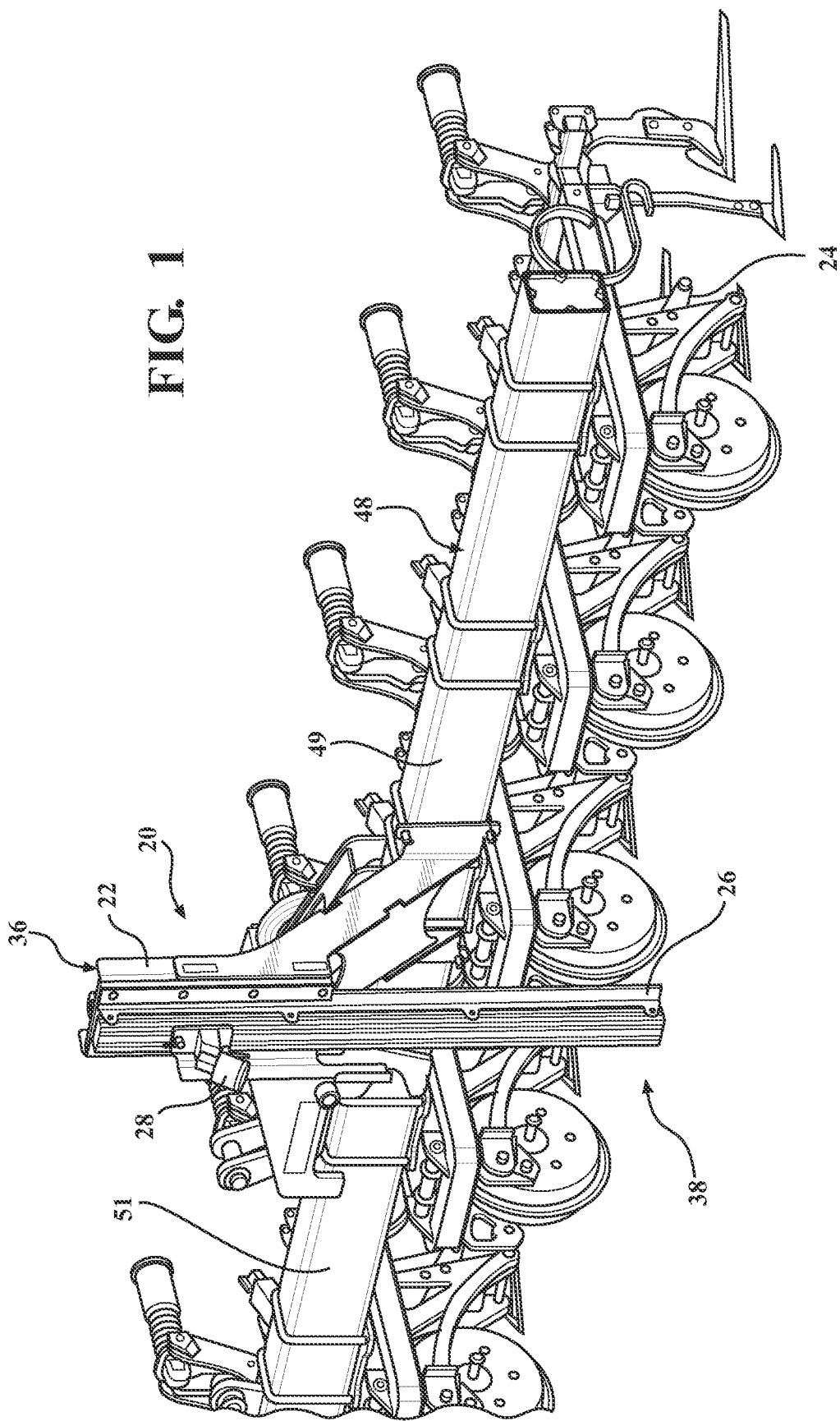
FIG. 1 illustrates a perspective view of an adjustable camera system mounted on an agricultural machine according to one embodiment of the present invention.
Figure 2:
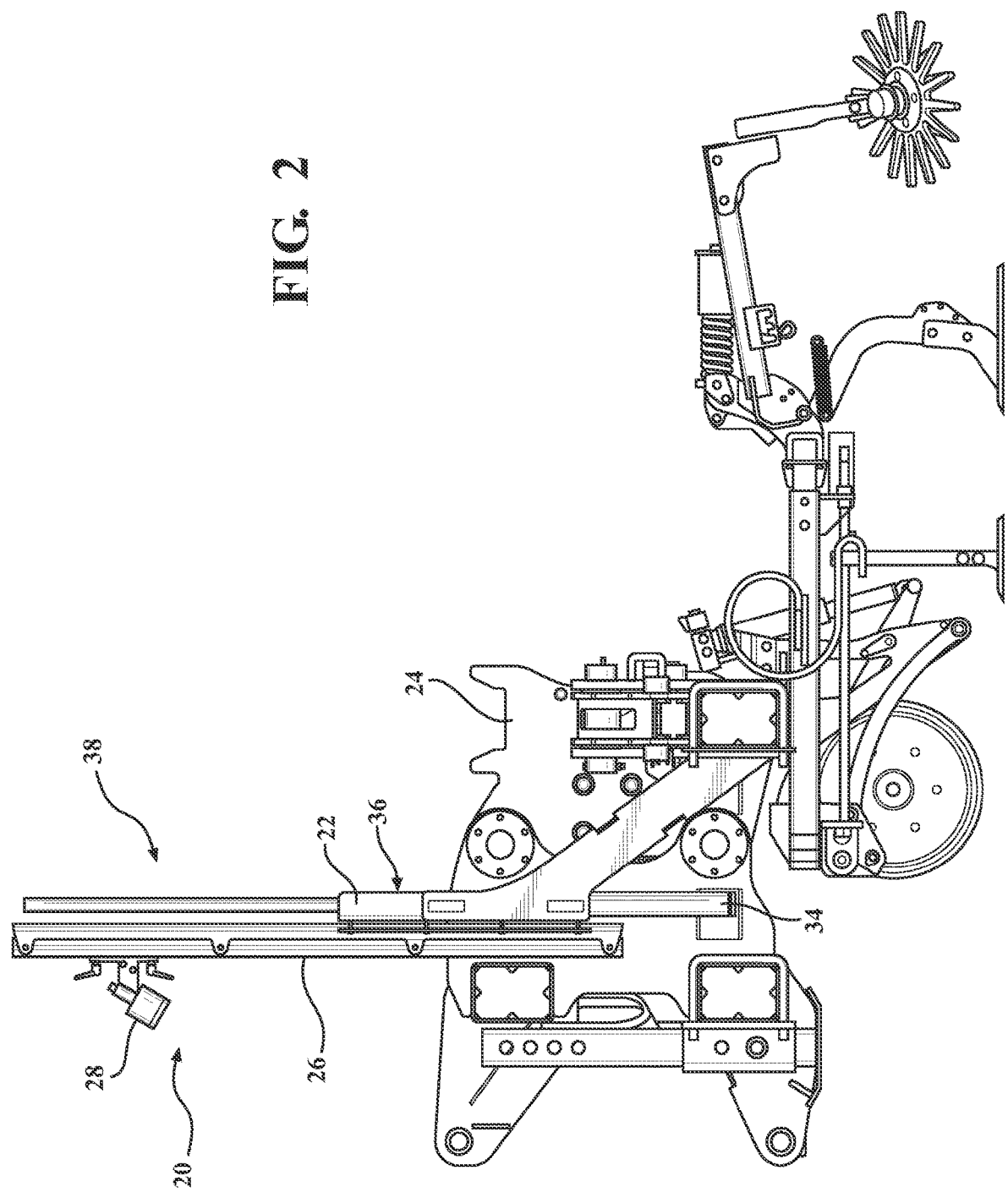
FIG. 2 illustrates a side view of the adjustable camera system and agricultural machine of FIG. 1.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. The terminology will include the words specifically mentioned, derivatives thereof, and words of similar import.

DETAILED DESCRIPTION OF THE EMBODIMENTS

Figure 5:
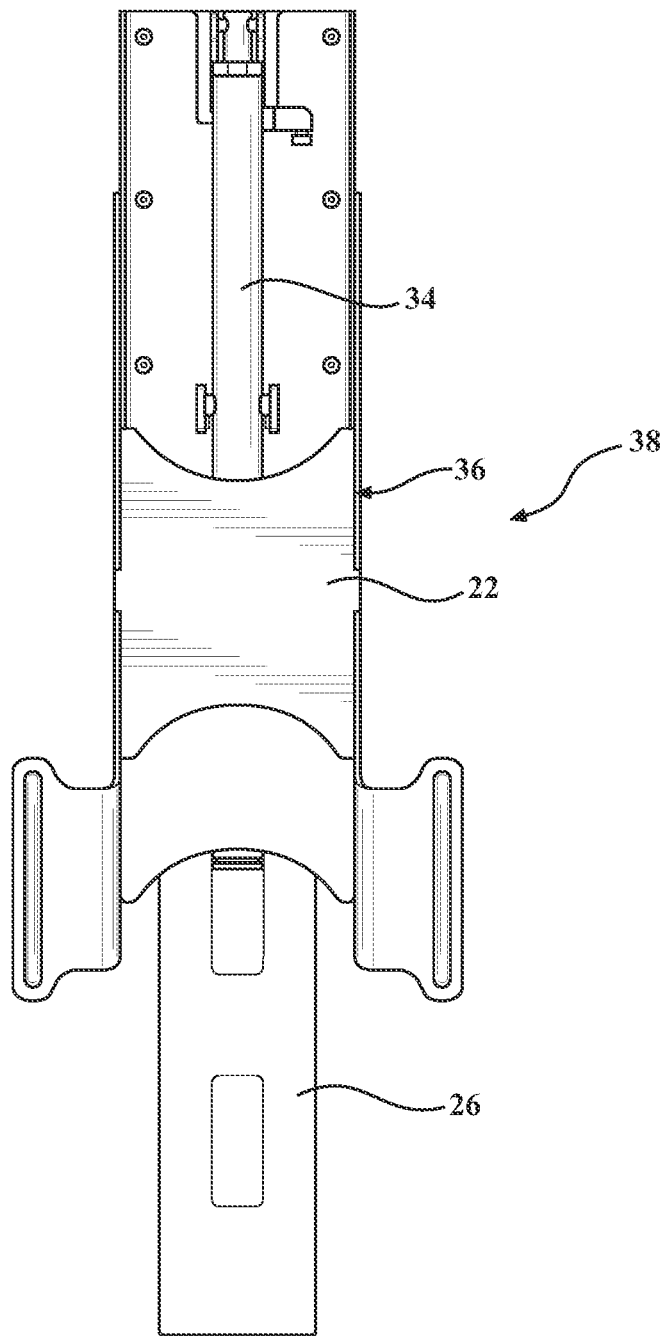
FIG. 5 illustrates a rear view of the adjustable camera system of FIG. 3A.
Figure 6:
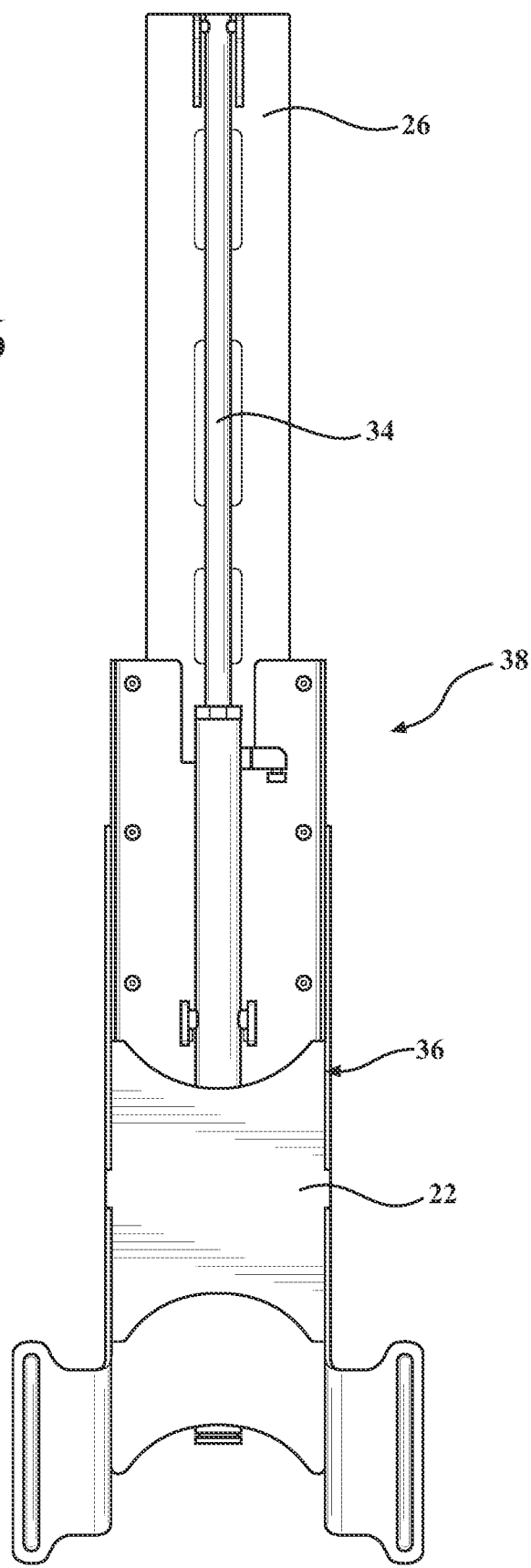
FIG. 6 illustrates a rear view of the adjustable camera system of FIG. 5 in an extended position.
Figure 7:
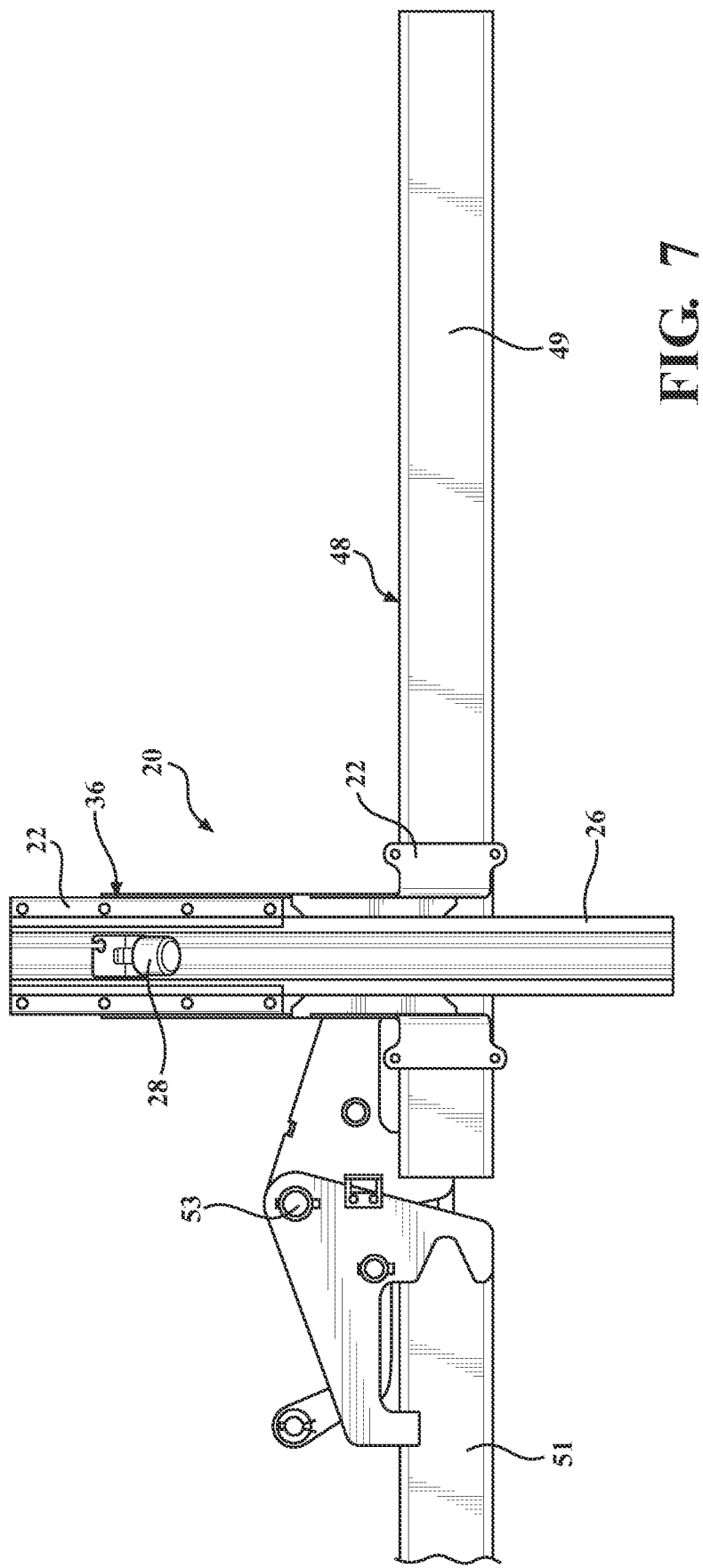
FIG. 7 illustrates a front view of the adjustable camera system of FIG. 1 attached to an unfolded tool bar in a retracted position.

Referring to the Figures, wherein like numerals indicate like or corresponding parts throughout the several views, an adjustable camera system 20 according to embodiments of the present invention is shown. The system 20 includes a camera 28 coupled to a mounting assembly 38. The mounting assembly 38 is adapted to raise and lower the camera 28. Referring to FIGS. 1-3A and 4-10, in one embodiment, the mounting assembly 38 includes a mounting arm 36 having a length configured to adjust between a retracted position, as reflected in FIG. 5, and an extended position, as reflected in FIG. 6. An exemplary mounting arm 36 comprises a telescoping arm. The mounting arm 36 comprises a mounting bracket 22, a rail 26 and an actuator 34. The mounting bracket 22 is adapted for mounting to an agricultural machine 24. The mounting bracket 22 may attach directly to the agricultural machine 24, or it may attach to any type of attachment or implement on the agricultural machine 24. The rail 26 is slidingly coupled to the mounting bracket 22, and the camera 28 is mounted to a distal end of the rail 26. The actuator 34 is coupled between the mounting bracket 22 and the rail 26, and is configured to slide the rail 26 along the mounting bracket 22. FIG. 5 shows the rail in a retracted position with respect to the mounting bracket 22, and FIG. 6 shows the rail 26 in an extended position with respect to the mounting bracket 22. The actuator 34 can be, but is not limited to, a hydraulic cylinder actuator, a linear actuator, or a rack and pinion. Hydraulic or electric power actuation may be provided by the agricultural machine 24 or implement as is commonly known.

A second embodiment of the mounting assembly 38' is shown in FIG. 3B, where like primed reference numerals represent similar elements as those described above. Only significant differences between the two embodiments are reflected in the Figures and the description below.

The mounting assembly 38' in the second embodiment includes a mounting bracket 22', a rail 26', a camera mount 46 and an actuator 34'. The rail 26' is fixedly coupled to the mounting bracket 22', the camera mount 46 is slidingly coupled to the rail 26', and the camera 28 is mounted to the camera mount 46. The actuator 34' is coupled between camera mount 46 and the rail 26', and is configured to slide the camera mount 46 along the rail 26'.

Figure 3A:
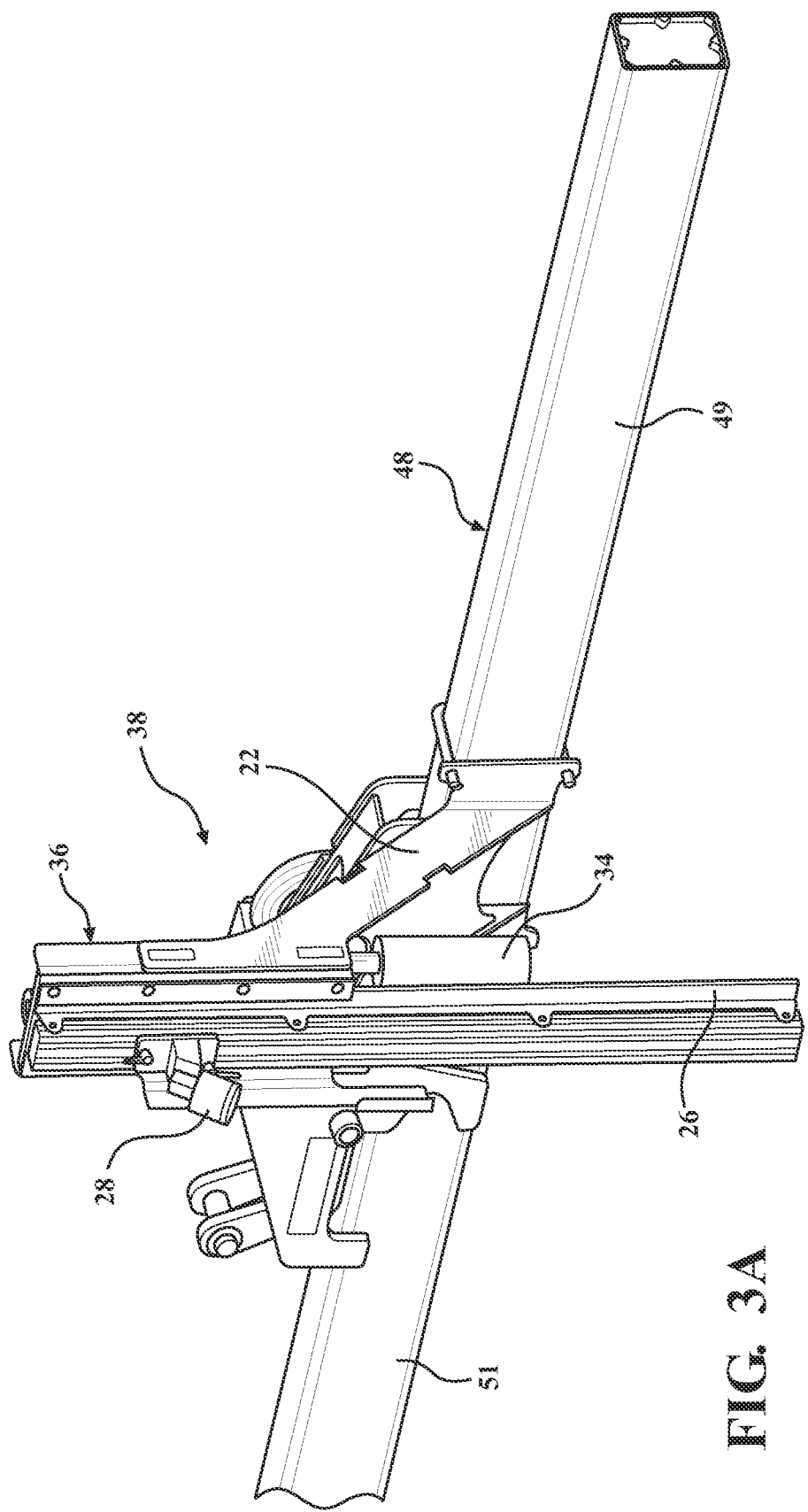
FIG. 3A illustrates a perspective view of the adjustable camera system of FIG. 1 in a retracted position.
Figure 3C:
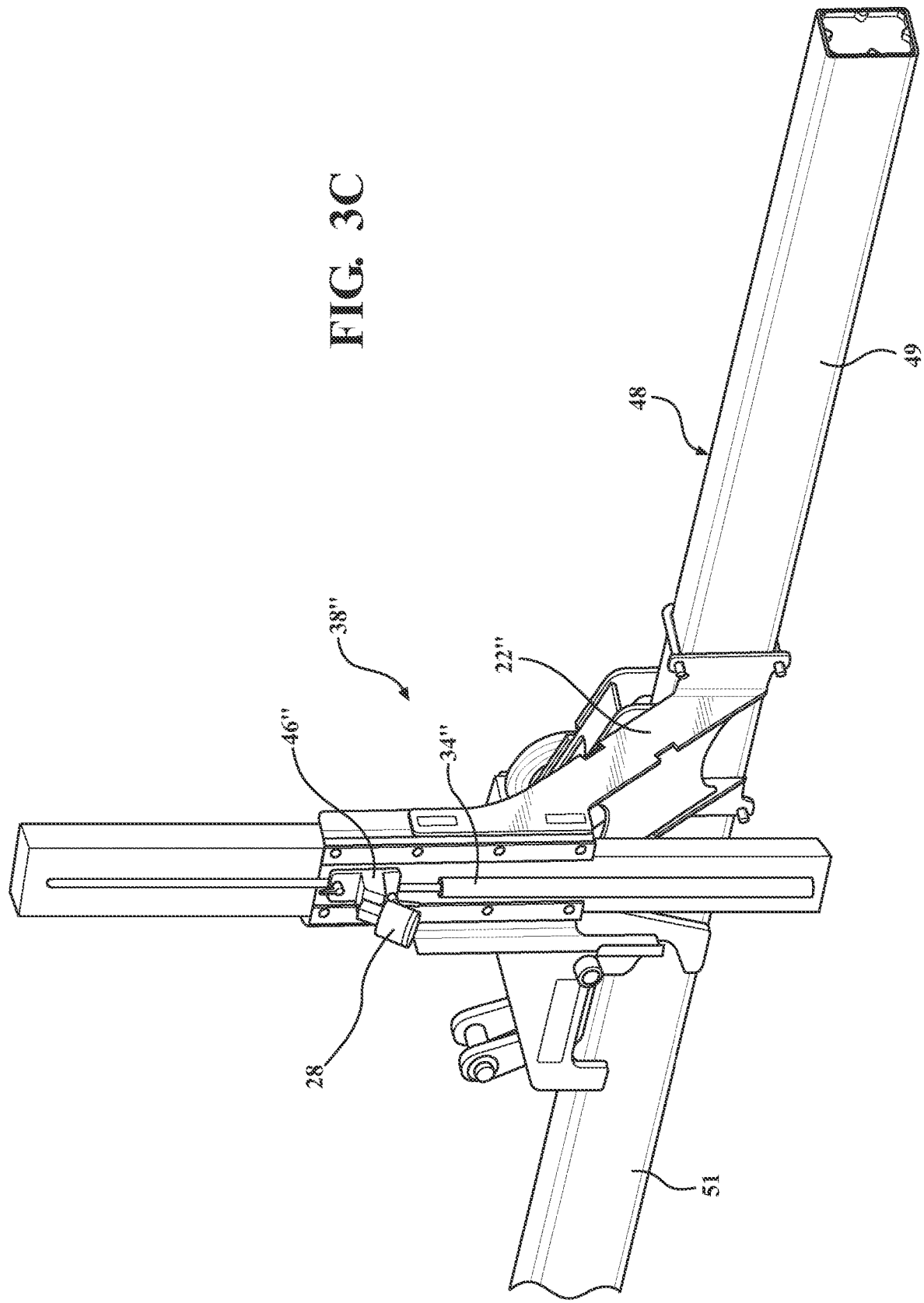
FIG. 3C illustrates a perspective view of another alternative embodiment of an adjustable camera system.
Figure 4:
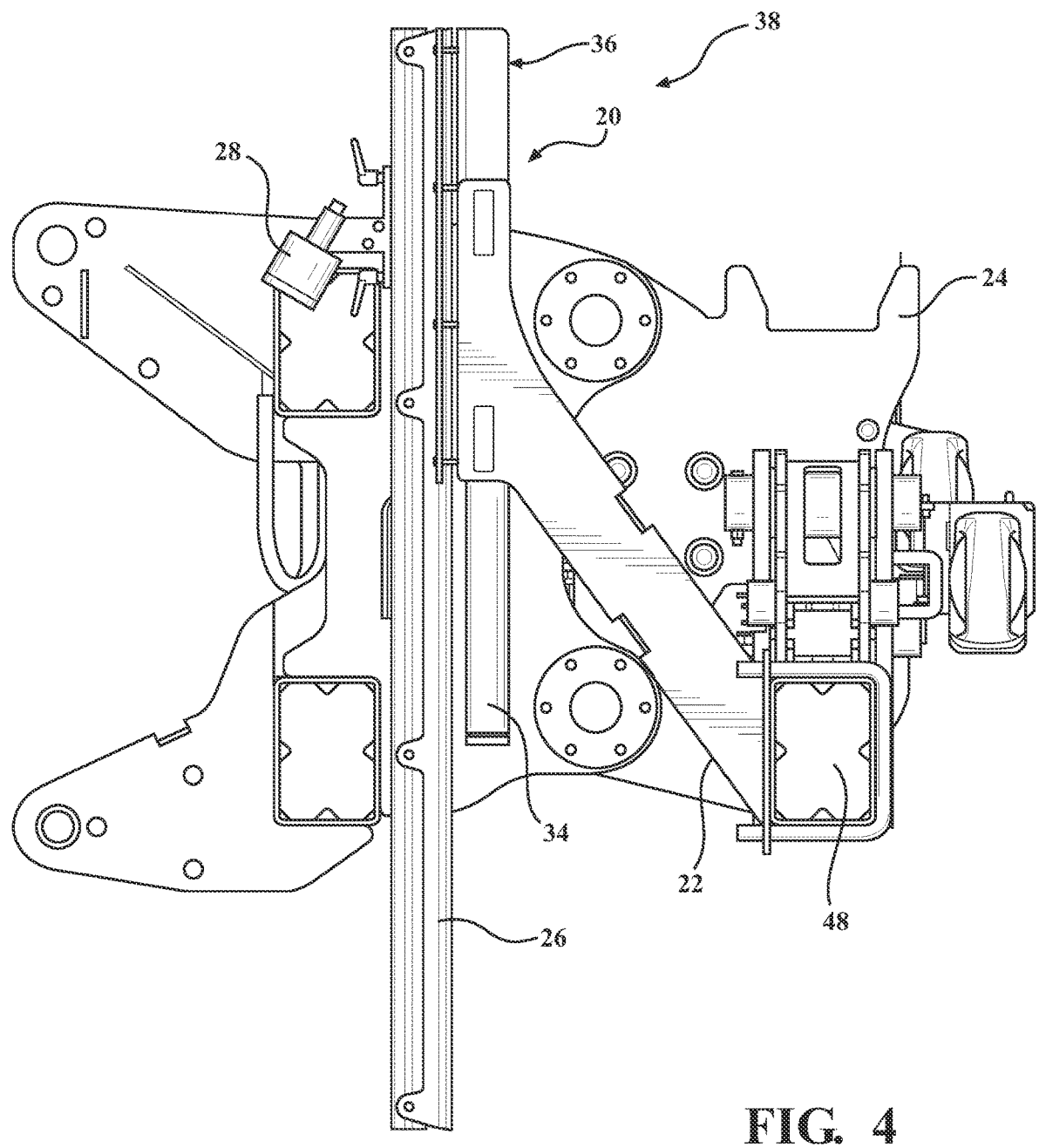
FIG. 4 illustrates a side view of the adjustable camera system of FIG. 3A.

A third embodiment of the mounting assembly 38" is shown in FIG. 3C, where like double-primed reference numerals represent similar elements as those described above. Only significant differences between the embodiments are reflected in the Figures and the description below.

The mounting assembly 38" in the third embodiment includes a mounting bracket 22", a camera mount 46" and an actuator 34". The camera mount 46" is slidingly coupled to the mounting bracket 22", and the camera 28 is mounted to the camera mount 46". The actuator 34" is coupled between camera mount 46" and the mounting bracket 22", and is configured to slide the camera mount 46" along the mounting bracket 22". In this embodiment, the mounting bracket 22" has a taller height dimension than the height dimension of the mounting brackets 22, 22' in the previously described embodiments.

Figure 8:
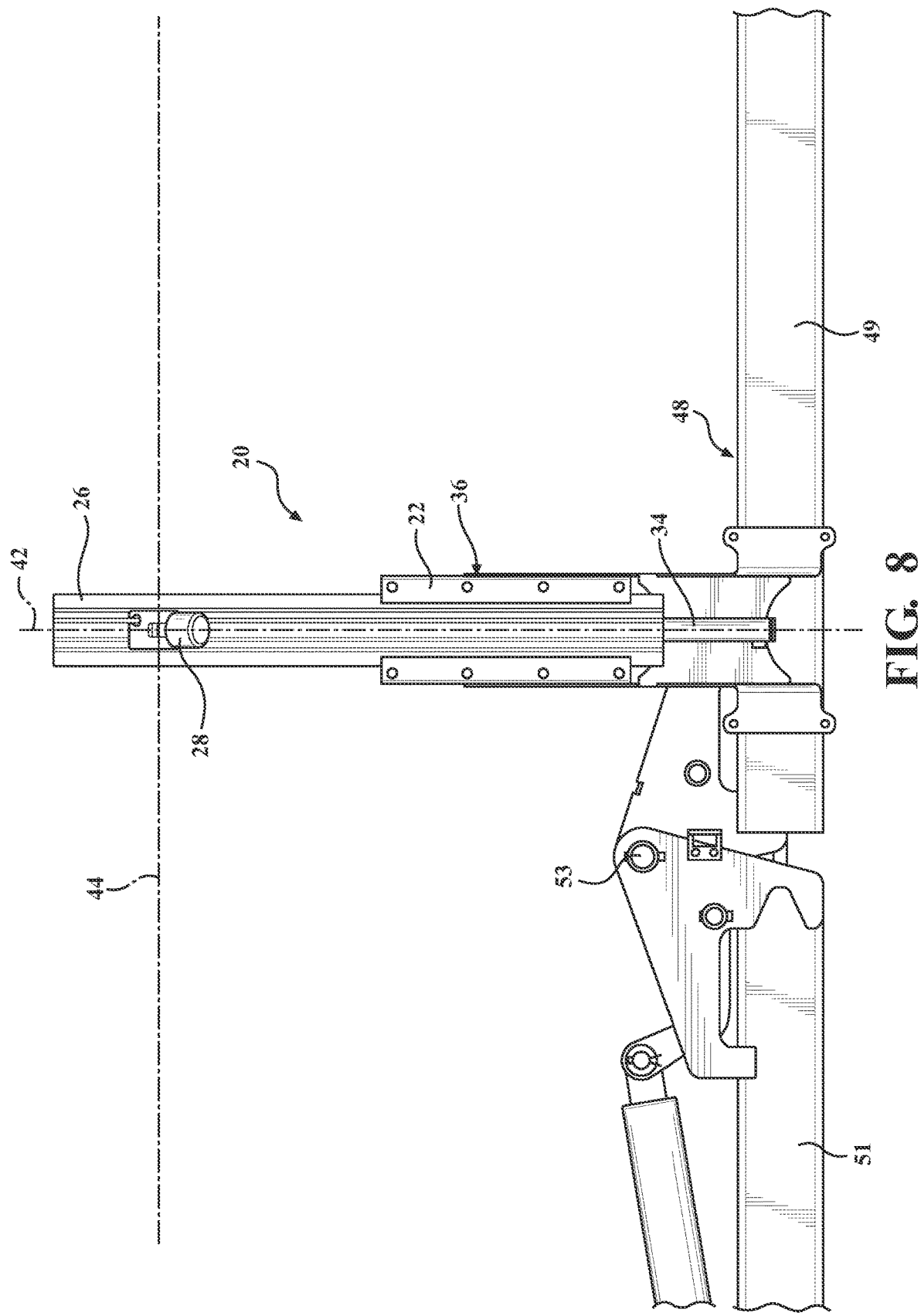
FIG. 8 illustrates a front view of the adjustable camera system and tool bar of FIG. 7 where the adjustable camera system is in an extended position.
Figure 9:
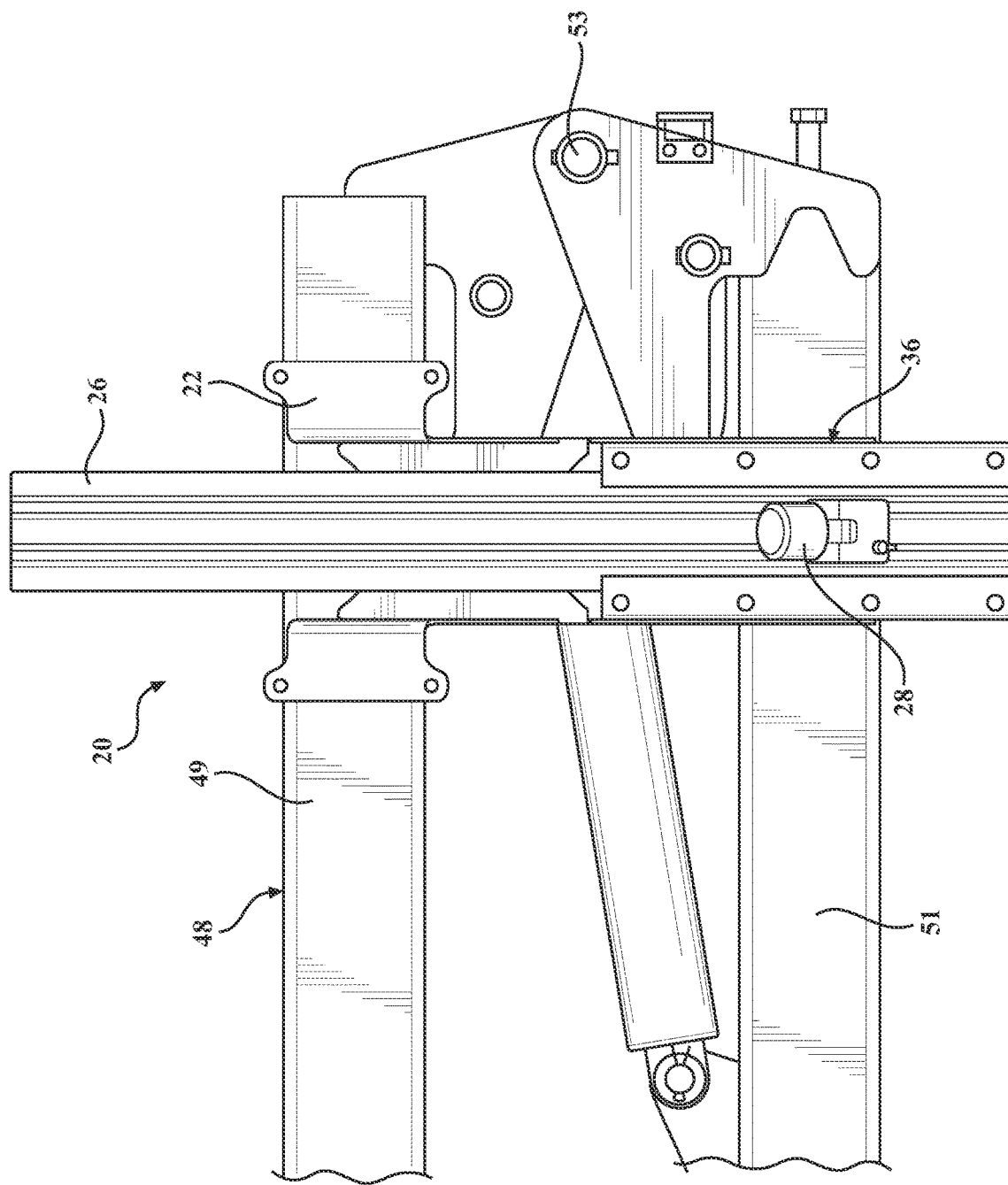
FIG. 9 illustrates a front view of the adjustable camera system and tool bar of FIG. 7 where the tool bar is in a folded position.
Figure 10:
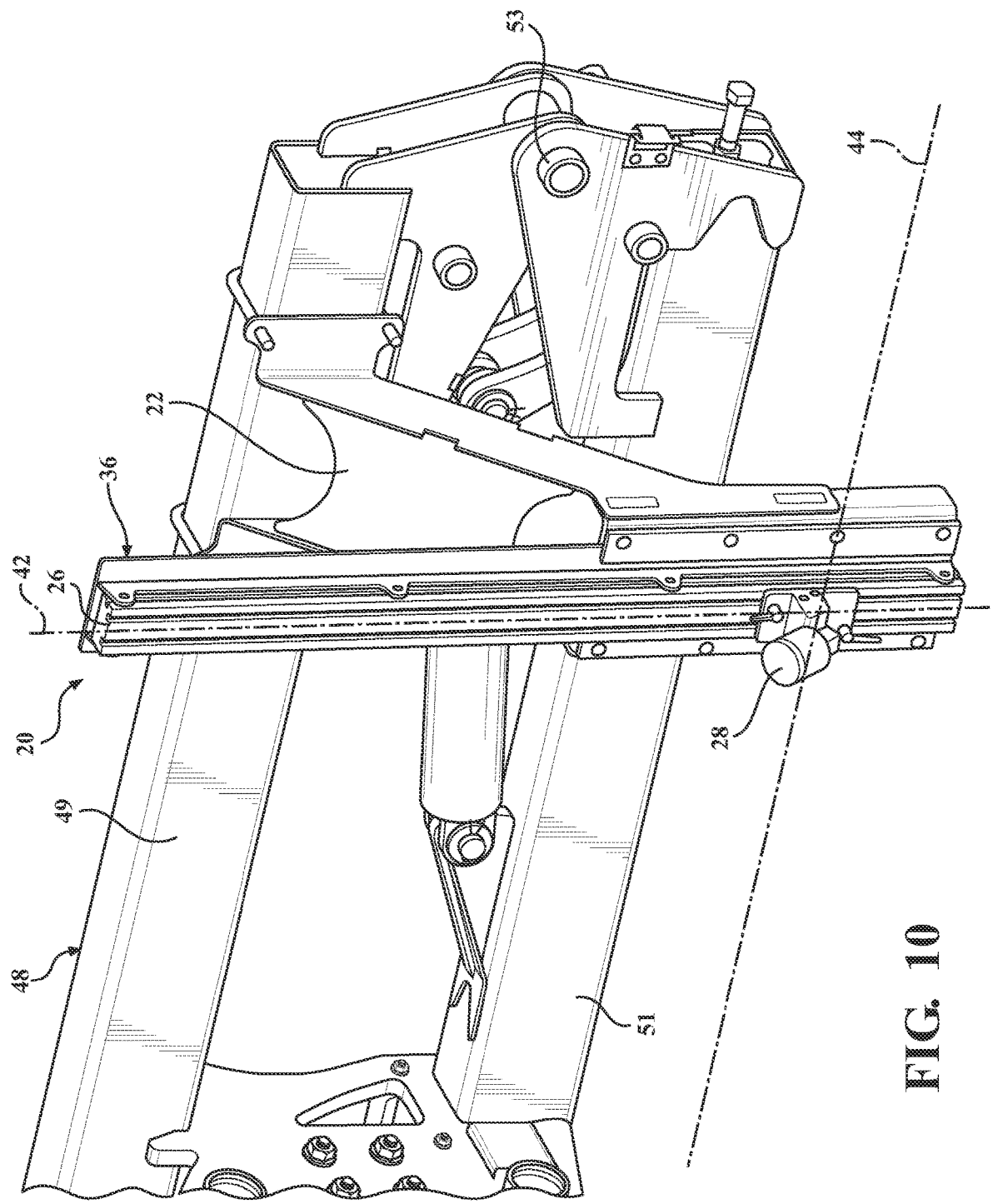
FIG. 10 illustrates a perspective view of the adjustable camera system and tool bar of FIG. 9.

As shown in FIG. 8, the camera 28 may rotate, or pivot, about a vertical axis 42 that runs parallel with the length of the rail 26, 26' and the mounting bracket 22". The camera 28 may also be equipped to pan up and down by rotating, or pivoting, about an axis 44 that runs perpendicular to the vertical axis 42.

Referring to FIGS. 7-10, the mounting bracket 22, 22', 22" may be attached to a foldable toolbar 48. The foldable toolbar 48 preferably is configured with opposite end sections 49 (only one end section shown) pivotally mounted via a pivotal connection 53 on a central toolbar section 51. The toolbar end sections 49 are foldable for storage and transport. The mounting bracket 22, 22', 22" and attached camera 28 are preferably attached to the toolbar 48 on one of the end sections 49. During operation, the toolbar 48 is in an unfolded position, as reflected in FIGS. 7-8, allowing actuator 34, 34', 34" to raise and lower the camera 28. During storage and transport, the actuator 34, 34', 34" is fully retracted and the toolbar 48 is folded, as reflected in FIGS. 9-10, which enables reduction in size of the transport envelope.

The adjustable camera system 20 is configured to automatically reposition the camera 28 so that it is at an optimal distance from the top of the crop rows. If the system 20 determines that the camera 28 is at the optimal distance, it does not adjust the height of the camera 28. If the system 20 determines that the camera 28 is too high, it lowers the camera 28. If the system 20 determines that the camera 28 is too low, the system 20 raises the camera 28.

Figure 11:
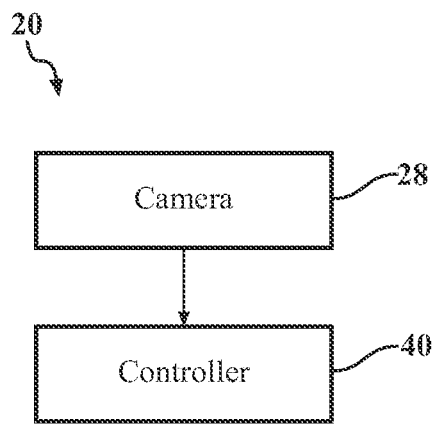
FIG. 11 illustrates a block diagram of the adjustable camera system according to one embodiment of the present invention.
Figure 12:
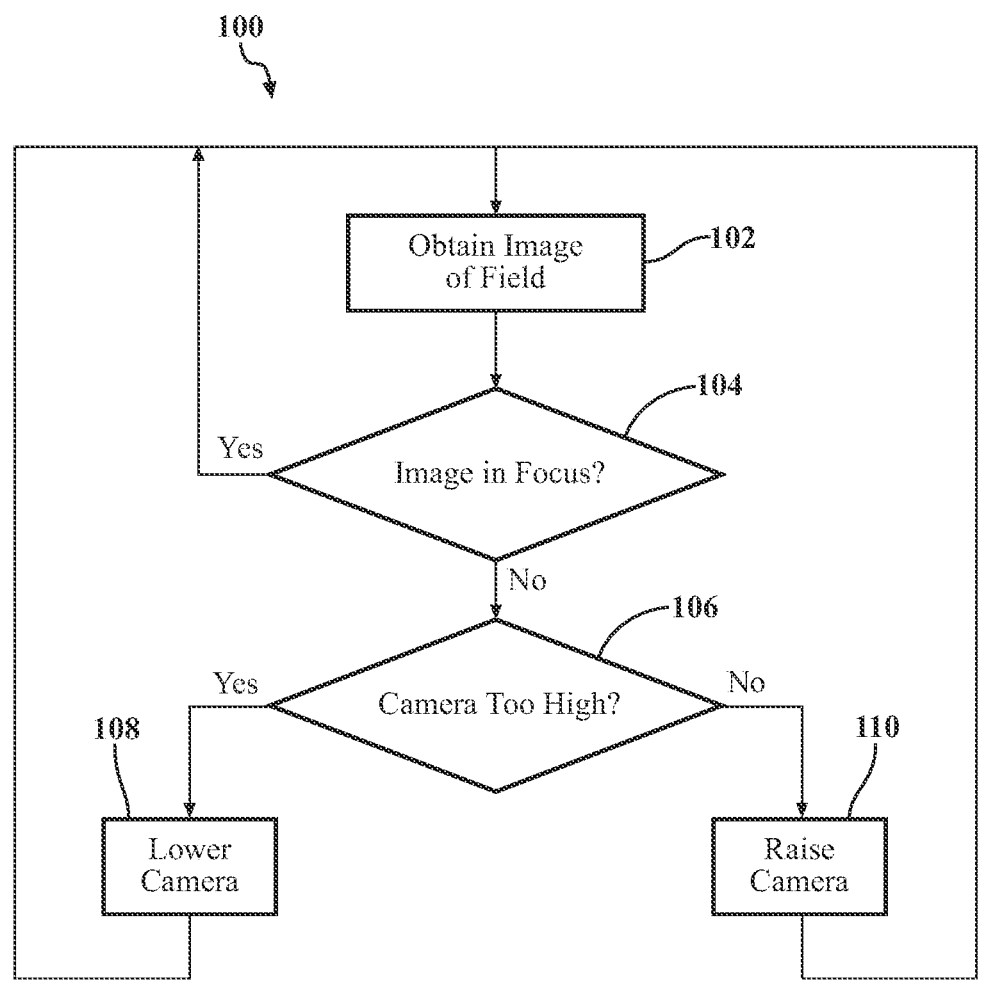
FIG. 12 illustrates a flow diagram of an exemplary method performed by the adjustable camera system according to one embodiment of the present invention.

Referring to FIG. 11, in one embodiment, the adjustable camera system 20 also includes a controller 40 to automatically adjust the height of the camera 28. FIG. 12 illustrates an exemplary method 100 for automatically adjusting the height of the camera 28 using the system reflected in FIG. 11. The camera 28 obtains images 30 of the field (step 102), and the controller 40 determines whether the image 30 is in focus (step 104). If the controller 40 determines that the image 30 is in focus, then the camera 28 is at an optimal distance from the top of the crop rows, and the system 20 returns to step 102 to continue monitoring the camera images 30. If at step 104 the controller 40 determines that the image 30 is not in focus, then the controller 40 determines whether the position of the camera 28 is too high above the top of the crop rows (step 106). If the controller 40 determines that the position of the camera 28 is too high, the controller 40 sends a signal to retract the actuator 34, 34', 34", thereby lowering the position of the camera 28. If at step 106 the controller 40 determines that the position of the camera 28 is not too high, then the controller 40 sends a signal to extend the actuator 34, 34', 34", thereby raising the position of the camera 28. The system 20 then returns to step 102 to process the next image 30.

Figure 13:
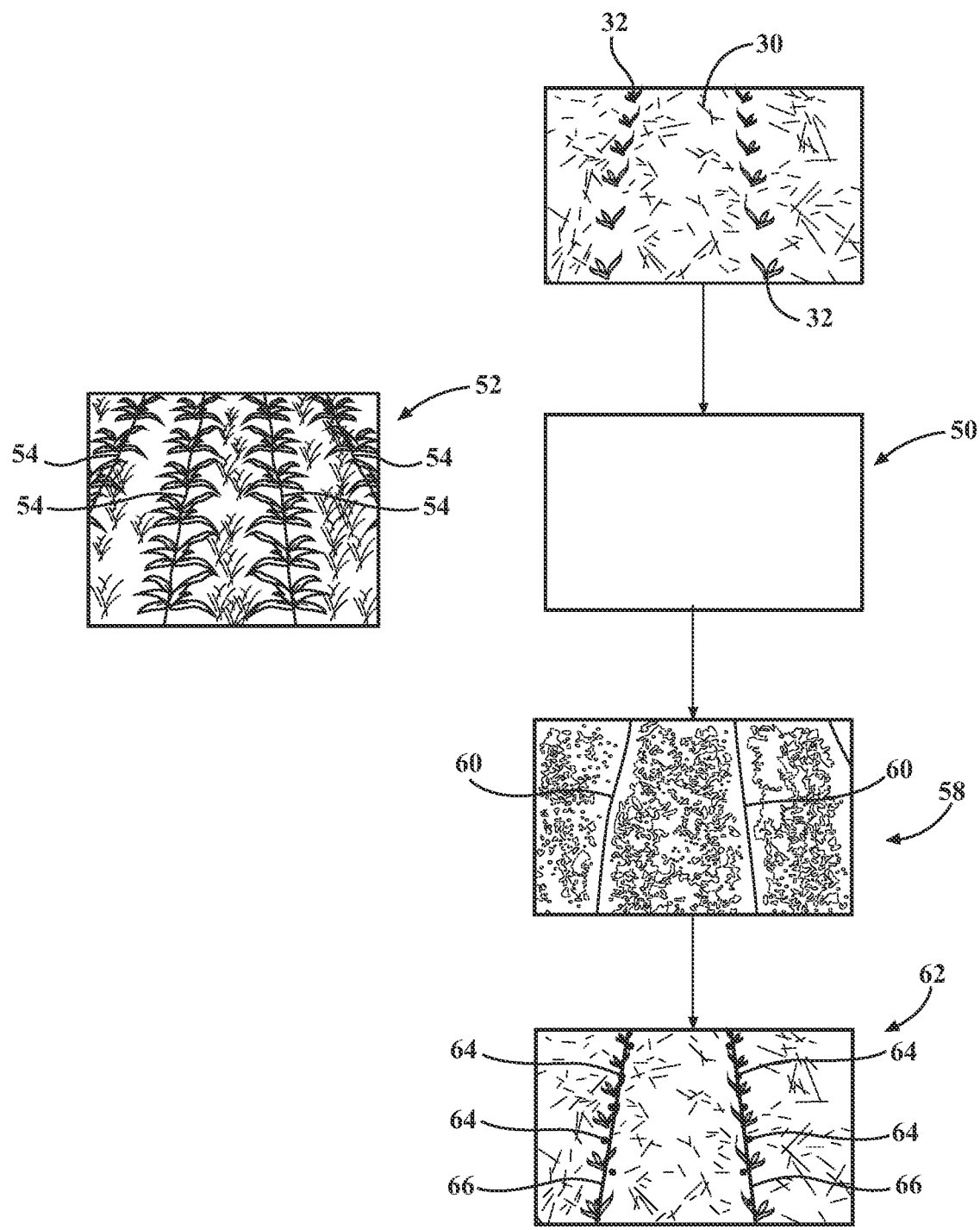
FIG. 13 illustrates a flow diagram illustrating the processing performed on an image by the adjustable camera system.

Referring to FIG. 13, in one embodiment, the controller 40 includes a convolutional neural network based semantic segmentation model 50. The model 50 is trained to identify crop rows using annotated images 52 of crop at various growth stages. The annotated images 52 include weak annotations 54 defining row positions on the images 52. Each weak annotation 54 comprises a line drawn above the crop row, and the model 50 is trained to infer larger scale row features in the image 52.

Figure 14:
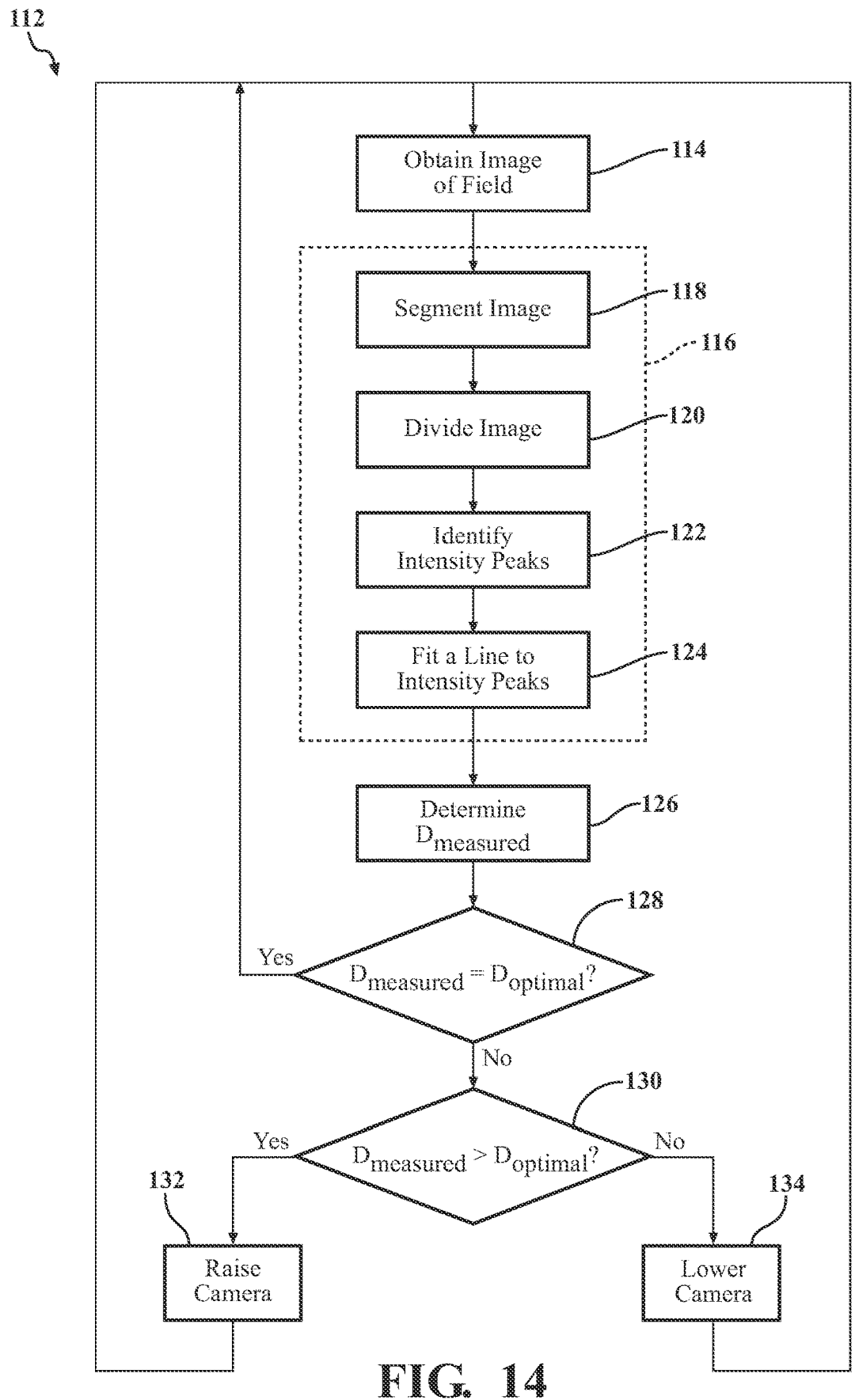
FIG. 14 illustrates a flow diagram of an exemplary method performed by the adjustable camera system according to another embodiment of the present invention.

FIG. 14 illustrates an exemplary process 112 performed by the adjustable camera system 20 to raise and lower the position of the camera 28. Referring to FIGS. 13 and 14, the camera 28 obtains an image 30 of the field, which includes images 30 of the rows of crop 32 (step 114). The controller 40 processes the image 30 to identify the top of the crop rows (step 116). In one embodiment, to identify the top of the crop rows, the semantic segmentation model 50 segments the image 30 (step 118) to create a pixel-wise classification 58 of the image 30. The pixel-wise classification 58 distinguishes the crop rows 60 from the other parts of the plant and any other background information, including the soil and other plants that may be in the image 30. The controller 40 applies a linear regression model to a kernel-based calculation of intensity peaks from the generated image mask. For example, the controller 40 may divide the pixel-wise classification 58 into 6 rows and 2 columns (step 120), i.e., into 12 sections. Alternatively, rather than dividing the entire pixel-wise classification 58 into sections, the controller 40 may focus on sections closer to the classified rows 60. The number of columns selected depends on the number of crop rows being analyzed. The controller 40 identifies the intensity peaks 64 within each section (step 122) by identifying the points with the highest number of crop row pixels across the width of each section. The intensity peaks 64 correspond to the center of the crop row within each section. The controller 40 applies a linear regression model to the intensity peaks 64 to create regression lines 66 representing the crop rows in the image 62 (step 124).

Figure 15:
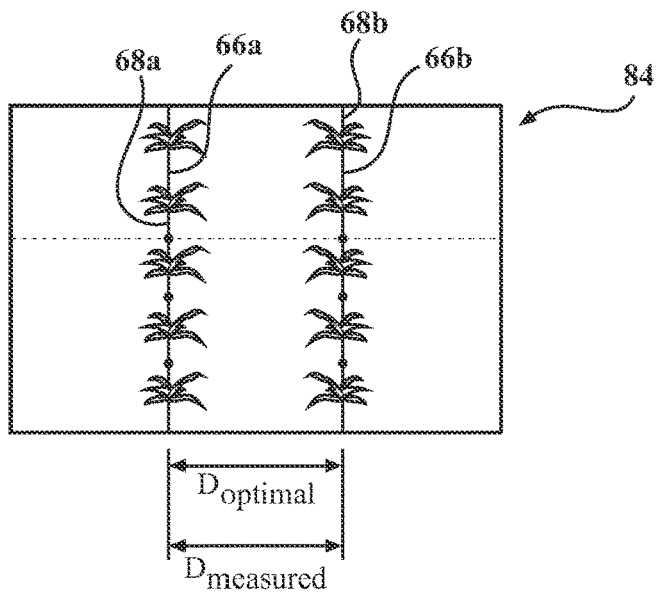
FIG. 15 illustrates a processed image from the adjustable camera system when the camera is at an optimal distance from the top of the crop rows.
Figure 16:
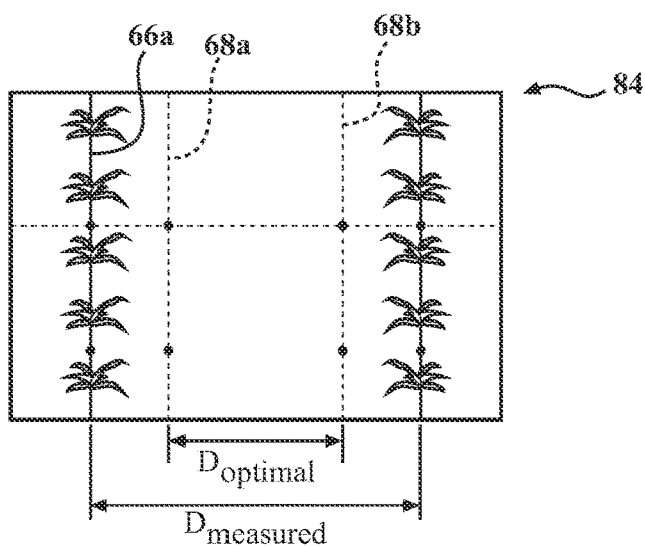
FIG. 16 illustrates a processed image from the adjustable camera system when the camera is lower than an optimal distance from the top of the crop rows.
Figure 17:
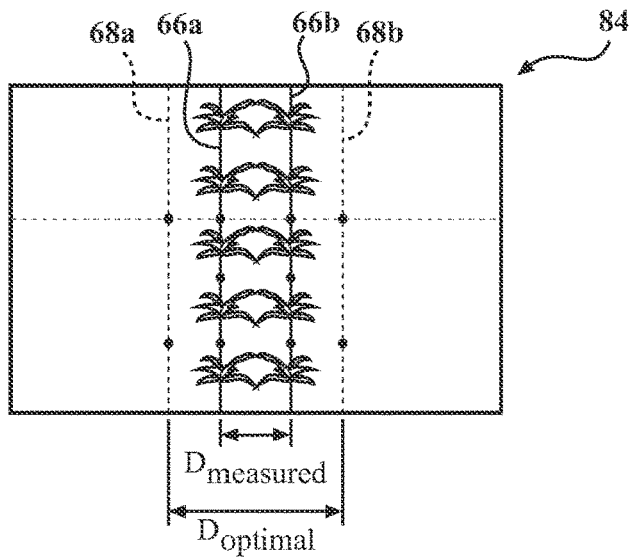
FIG. 17 illustrates a processed image from the adjustable camera system when the camera is higher than an optimal distance from the top of the crop rows.

Because the actual distance between crop rows is known and fixed, when the camera 28 is at an optimal distance from the top of the crop rows, the average distance between the crop rows in the images 30 will also be fixed. The fixed distance is reflected in FIGS. 15-17 as expected stationary lines 68a, 68b. FIG. 15 illustrates a processed image 84 when the camera is at the optimal distance from the top of the crop rows. Here, the regression lines 66a, 66b align with expected stationary lines 68a, 68b, and the distance between the regression lines 66a, 66b $D_{measured}$ is equal to the distance between the expected stationary lines 68a, 68b $D_{optimal}$. The present invention uses this optimal distance $D_{optimal}$ to determine whether to raise or lower the camera 28. If the camera 28 is too close to the top of the crop rows, as reflected in FIG. 16, the average distance between the crop rows measured from the image 30 $D_{measured}$ will be greater than the optimal distance $D_{optimal}$ because the image 30 will appear to expand the distance between the crop rows. Likewise, if the camera 28 is too far from the top of the crop rows, as reflected in FIG. 17, the average distance between the regression lines 66a, 66b $D_{measured}$ will be less than the optimal distance $D_{optimal}$ because the image 30 will appear to compress the distance between the crop rows.

Referring back to FIG. 14, the system determines the average distance $D_{measured}$ between the regression lines 66 (step 126) and determines whether the average distance $D_{measured}$ between the regression lines 66 is equal to the optimal distance $D_{optimal}$ (step 128). If the distances are equal, then the camera 28 is at an optimal distance from the top of the crop rows, and the system 20 returns to step 114 to continue monitoring the camera images 30. If at step 128 the system 20 determines that the distances are not equal, then the system 20 determines whether the average distance $D_{measured}$ between the regression lines 66 is greater than the optimal distance $D_{optimal}$ (step 130). If the system 20 determines that the average distance $D_{measured}$ between the regression lines 66 is greater than the optimal distance $D_{optimal}$, the controller 40 sends a signal to extend the actuator 34, 34', 34", thereby raising the position of the camera 28 (step 132). Otherwise, the average distance $D_{measured}$ between the regression lines 66 is less than the optimal distance $D_{optimal}$, and the controller 40 sends a signal to retract the actuator 34, 34', 34", thereby lowering the position of the camera 28 (step 134). The system 20 then returns to step 114 to process the next image 30.

The system 20 may be configured with a list of predetermined optimal distances $D_{optimal}$, selectable by the operator of the harvester. The predetermined optimal distances $D_{optimal}$ may depend on a number of factors, such as the type of crop or the actual distance between crop rows.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, vertical, horizontal, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

The invention claimed is:

1. An adjustable camera system comprising:
   a camera;
   a mounting assembly including a mounting bracket coupled to the camera, wherein the mounting assembly is adapted to raise and lower the camera;
   a toolbar having a central section and an end section connected to the central section by a pivotal connection, wherein the mounting bracket is attached to the end section of the toolbar; and
   a controller configured to use an image of an object from the camera to determine whether the camera is at an optimal position from the object, and if the controller determines that the camera is not at the optimal position, the controller sends a signal to the mounting assembly to raise or lower the camera.

2. The adjustable camera system according to claim 1, wherein the mounting assembly comprises:
   a camera mount slidingly coupled to the mounting bracket; and an actuator coupled between the camera mount and the mounting bracket, wherein the actuator is configured to slide the camera mount along the mounting bracket;

wherein the camera is coupled to the camera mount and if the controller determines that the camera is not at the optimal position, the controller sends a signal to the actuator to slide the camera mount along the mounting bracket.

3. The adjustable camera system according to claim 2, wherein the controller determines whether the camera is at the optimal position by determining whether the image is in focus.

4. The adjustable camera system according to claim 3, wherein:
  the mounting bracket is adapted for attachment to an agricultural machine;
  the object comprises rows of crop; and
  the controller determines whether the camera is at the optimal position by determining whether a distance between the rows of crop in the image equals an optimal distance.

5. The adjustable camera system according to claim 4, wherein if the controller determines that the distance between the rows of crop in the image is greater than the optimal distance, the controller sends a signal to the actuator to raise the camera.

6. The adjustable camera system according to claim 4, wherein if the controller determines that the distance between the rows of crop in the image is less than the optimal distance, the controller sends a signal to the actuator to lower the camera.

7. The adjustable camera system according to claim 4, wherein the end section of the toolbar and the attached camera pivot about the pivotal connection between an unfolded position and a folded position.

8. The adjustable camera system according to claim 4, wherein the camera mount is pivotally coupled to the mounting bracket.

9. The adjustable camera system according to claim 1, wherein the mounting assembly comprises a mounting arm having a length configured to adjust between a retracted position and an extended position; and wherein:
  the camera is mounted to one end of the mounting arm; and
  if the controller determines that the camera is not at the optimal position, the controller sends a signal to the mounting arm to adjust the length of the mounting arm.

10. The adjustable camera system according to claim 9, wherein the mounting arm comprises a telescoping arm.

11. The adjustable camera system according to claim 9, wherein the controller determines whether the camera is at the optimal position by determining whether the image is in focus.

12. The adjustable camera system according to claim 9, wherein the mounting arm comprises:
  a rail slidingly coupled to the mounting bracket; and
  an actuator coupled between the mounting bracket and the rail, wherein the actuator is configured to slide the rail along the mounting bracket, and wherein if the controller determines that the camera is not at the optimal position, the controller sends a signal to the actuator to slide the rail along the mounting bracket.

13. The adjustable camera system according to claim 12, wherein:
  the mounting bracket is adapted for attachment to an agricultural machine;
  the object comprises rows of crop; and
  the controller determines whether the camera is at the optimal position by determining whether a distance between the rows of crop in the image equals an optimal distance.

14. The adjustable camera system according to claim 13, wherein if the controller determines that the distance between the rows of crop in the image is greater than the optimal distance, the controller sends a signal to the actuator to raise the camera.

15. The adjustable camera system according to claim 13, wherein if the controller determines that the distance between the rows of crop in the image is less than the optimal distance, the controller sends a signal to the actuator to lower the camera.

16. The adjustable camera system according to claim 13, wherein the end section of the toolbar and the attached camera pivot about the pivotal connection between an unfolded position and a folded position.

17. The adjustable camera system according to claim 13, wherein the camera is pivotally coupled to the rail.

18. A method for autonomously adjusting a position of a camera mounted to an agricultural machine with a controller, the method comprising:
  obtaining an image of rows of crop from the camera;
  processing the image with the controller using a convolutional neural network based semantic segmentation model to identify tops of the rows of crop;
  using the identified tops of the rows of crop to determine whether the camera is at an optimal position from the object; and
  if it is determined that the camera is not at the optimal position, raising or lowering the camera.

19. The method according to claim 18, wherein the step of determining whether the camera is at the optimal position comprises determining whether the image is in focus.

20. The method according to claim 19, wherein the step of determining whether the camera is at the optimal position comprises determining whether a distance between the rows of crop in the image equals an optimal distance.

21. The method according to claim 20, further comprising the step of determining whether the distance between the rows of crop is greater than the optimal distance, and if it determined that the distance between the rows of crop is greater than the optimal distance, raising the camera.

22. The method according to claim 20, further comprising the step of determining whether the distance between the rows of crop is less than the optimal distance, and if it is determined that the distance between the rows of crop is less than the optimal distance, lowering the camera.

* * * * *